United States Patent [19]

Alfke et al.

[11] 4,437,158
[45] Mar. 13, 1984

[54] SYSTEM BUS PROTOCOL INTERFACE CIRCUIT

[75] Inventors: Peter H. Alfke, Los Altos Hills; Krishna Rallapali, San Jose, both of Calif.; David MacMillan, Boston, Mass.

[73] Assignee: Advanced Micro Devices, Inc., Sunnyvale, Calif.

[21] Appl. No.: 306,453

[22] Filed: Sep. 28, 1981

[51] Int. Cl.[3] .......................... G06F 3/02; G06F 9/18
[52] U.S. Cl. .................................................. 364/200
[58] Field of Search ............................. 364/200, 900

[56] References Cited

U.S. PATENT DOCUMENTS

| 3,480,914 | 11/1969 | Schlaeppi | 364/200 |
|---|---|---|---|
| 3,937,925 | 2/1976 | Boothroyd | 364/900 |
| 4,040,028 | 8/1977 | Pauker et al. | 364/200 |
| 4,141,068 | 2/1979 | Mager et al. | 364/200 |
| 4,149,238 | 4/1979 | James et al. | 364/200 |
| 4,149,241 | 4/1979 | Patterson | 364/200 |
| 4,188,617 | 2/1980 | Favchier et al. | 364/900 |
| 4,261,034 | 4/1981 | Saccomano et al. | 364/200 |
| 4,316,247 | 2/1982 | Iwamoto | 364/200 |
| 4,320,457 | 3/1982 | Tanikawa | 364/200 |

Primary Examiner—Jerry Smith
Assistant Examiner—Jameson Lee
Attorney, Agent, or Firm—Gary T. Aka; Patrick T. King

[57] ABSTRACT

The present invention provides a bus protocol interface circuit for the peripheral units that prevents a conflict in bus requests between the peripheral units and permits bipolar drivers to be used for fast operation. The interface circuit comprises a logic means coupled to the bus acknowledgment line input terminal and the bus acknowledgment line output terminal for generating a logic output signal responsive to the signals on the bus acknowledgement line input and output terminals, and latching means coupled between the bus request line and the bus request line terminal, and further connected to the output of the logic means and the bus acknowledgment line output terminal, for latching into a state consistent with a bus request signal from any one of the peripheral units and for unlatching from the consistent state upon receipt of a bus acknowledgment signal in response to the bus request signal.

5 Claims, 3 Drawing Figures

SYSTEM BUS PROTOCOL INTERFACE CIRCUIT

BACKGROUND OF THE INVENTION

This invention relates to commputer systems and, more particularly, to an interface circuit for the orderly transfer of control information transmitted along a bus coupling several peripheral units and the central control unit of the computer system.

A computer system bus constitutes a set of communication lines disposed for coupling information among various units of the system. Control over the bus normally resides with the control unit, which is part of a central processing unit (CPU). Oftentimes, however, control of the bus must be transfered to a unit peripheral to the central control unit so that particular operations may be performed. An example of an operation requiring control of the bus by a peripheral unit is direct memory access by which data are transferred to or from the system's memory, or from the system's memory to the outside world or the reverse, without having the data move through the CPU.

Various circuit arrangements are used to allow the transfer of bus control between the central control unit and its various peripheral devices. One such arrangement found in microcomputer systems is shown in FIG. 1, which has a CPU 10 connected with a plurality of peripheral units, shown as blocks 14, 15, and 16 by lines 11,12 and 13. The continuation of the lines 11 and 12 by broken lines to the right indicate more peripheral units may be connected in a similar manner to the CPU 10.

These peripheral units can be an entire subsystem, such as a magnetic tape unit which could be used to store information in a computer system. However, as used herein, the term "peripheral unit" refers to that part of the subsystem which communicates directly with the CPU 10. In a microcomputer system the peripheral unit as defined is typically in the form of a single integrated circuit device.

Each peripheral unit is connected in parallel to the CPU 10 by a bus request line 11 with a branch line 13. The term BUSREQ will sometimes hereinafter refer to the signal transmitted on the bus request line 11. Arrows on the branch line 13 indicate that signals on the bus request lines 11 and 13 are bidirectional, i.e., signals pass from the central control unit of the CPU 10 to each peripheral unit 14, 15, and 16 and pass from the peripheral units back to the central control unit.

The peripheral units of the system are also connected in series to the central control unit by a bus acknowledgment line 12. The term BUSACK will sometimes hereinafter refer to the signal transmitted on the line 12. Each peripheral unit is connected to the line 12 by a bus acknowledgment input terminal 51 and a bus acknowledgment output terminal 52. The terms BAI and BAO will sometimes hereinafter refer to the terminals 51 and 52, respectively. Arrows on the bus acknowledgment line 12 indicate that BUSACK signals from the central control unit of the CPU 10 enter the peripheral unit through the BAI input terminal 51 and are relayed to a succeeding peripheral unit by the BAO output terminal 52. For example, the BAO ouput terminal 52 of the preceding peripheral unit 14 transmits a BUSACK signal to the peripheral unit 15 which receives the signal on the line 12 through its input terminal 51.

A peripheral unit requests control of the bus (not shown) by transmitting a BUSREQ signal from its bus request terminal 50 (BUSREQ) through its branch line 13 onto the main bus request line 11 to the CPU 10. The CPU monitors the bus request line 11 and grants the use of the bus at an appropriate time to the requesting device. Such granting of bus control is indicated by sending an acknowledgement signal (BUSACK) from the CPU 10 to the serially connected peripheral devices along the bus acknowledgment line 12. If there is only one peripheral device in the system, then that device will receive the acknowledgement signal through its BAI input terminal 51. The peripheral unit will then take control of the bus. When the peripheral unit has completed its use of the bus, it stops driving the bus request line 11. The central control unit of the CPU 10 senses this condition, resumes control of the bus and indicates this by removing its BUSACK signal on the line 12 to the peripheral unit.

For a system with more than one peripheral unit, this arrangement in FIG. 1 establishes a priority based upon the proximity of the peripheral unit to the CPU 10. Each peripheral unit is set so that it will not transfer a BUSACK signal if the unit is the one requesting control of the bus. For example, the peripheral unit 14 has the highest priority over the remaining peripheral units. It is the first to receive the bus acknowledgment signal from the CPU 10 and it wil block the bus acknowledgment signal from going to the peripherial unit 15 if the peripheral unit 14 is requesting bus control. The unit 14 thus has the first chance of bus control. If the unit 14 is not the unit requesting bus control, it allows the bus acknowledgment signal on the line 12 to pass to the next peripheral unit. The bus acknowledgment signal continues to succeeding peripheral units until the unit requesting bus control is reached. In this manner the connections of the peripheral units establish priority in the bus control protocol.

In cases where two (or more) units have made a simultaneous request for control of the bus, the nearer unit (the device closer to the CPU 10) gains control first and blocks the bus acknowledgment signal propagation to the subsequent units. When the first unit is through, it allows the bus acknowledgment signal to travel to the succeeding units until the bus acknowledgment signal is received by the second requesting peripheral unit. At this point the second unit gains control of the bus. When all of such units which requested the bus have completed their operations, the BUSREQ signal on the lines 11 and 13 is removed. The CPU 10 senses this change in signal status, removes the BUSACK signal and regains control of the bus.

Such a bus protocol arrangement has certain shortcomings. One such shortcoming occurs when one particular peripheral unit has control of the bus. That is, the unit has a signal on the bus request lines 11, 13 and the CPU 10 has generated a BUSACK signal. All of the peripheral units preceding the unit with bus control are in receipt of the BUSACK signal, while the controlling peripheral unit blocks the signal from subsequent peripheral units. When the unit in control completes its operation, it stops sending its BUSREQ signal, thus removing the signal on the bus request lines 11, 13. This same unit will also transmit the BUSACK signal originating in the CPU 10 to the subsequent peripheral units. By operation of the CPU 10, which is synchronized with a clock, the BUSACK signal will usually be removed one clock period after the BUSREQ signal removal has been sensed. However, a problem will arise if, during that interval, another unit requests the bus.

This second unit will then send a BUSREQ signal and will also be in receipt of a BUSACK signal thereby allowing it to assume bus control. But within one clock period the CPU 10 will remove the BUSACK signal and assert control of the bus. Thus, a conflict between the CPU 10 and the second requesting device might occur.

A seemingly simple solution to this problem is to require that the peripheral units generate a BUSREQ only after two or more clock periods have elapsed following completion of a bus request by the first peripheral unit. Such a simple solution, however, means that all the peripheral units must receive the CPU clock signals. An extra signal line to the peripheral units is required and, if the peripheral unit is manufactured in the form of an integrated circuit, another pin for the integrated circuit package is required. This solution is not desirable and is sometimes impractical.

Typically, in most microcomputer systems the CPU and peripheral units are manufactured in MOS technology. This means that the current handling ability of such highly integrated MOS transistor devices is limited. On the other hand, large currents are desirable for driving the signals on the lines connecting the various units of the computer system, such as the bus request line 11, 13 in FIG. 1. In an actual system, these lines would be spread over several printed circuit boards resulting in large capacitances; and, large currents are required to quickly change the voltage levels on these lines.

In the computer system shown in FIG. 1, the bus acknowledgment line 12 does not usually have this shortcoming since the line 12 is broken into short segments between peripheral units. Each segment has a small capacitance in contrast to the large capacitance of the bus request line with its long main line 11 and many branches 13.

A solution to this problem is to install bipolar buffer drivers at the bus request terminal of each peripheral unit as shown in FIG. 2. This solution is unsatisfactory, however, because the bus request terminal of each peripheral unit must have both input sensing and output driving capabilities for proper functioning of the bus request protocol. The particular peripheral unit must be able to sense when another peripheral unit is making a bus request signal. This bidirectional operation is not possible with the bipolar buffer drivers. To get around this, it is possible to make another bus terminal for each peripheral unit which will receive the BUSREQ signal directly from the line 11. However, this further complicates the arrangement and requires another pin for each peripheral unit.

SUMMARY OF THE INVENTION

To avoid the disadvantages mentioned above in a computer system having a central control unit with a plurality of peripheral units and a common bus, each of the peripheral units are connected in parallel to the central control unit by a bus request line through a bus request terminal for requesting control of the bus, and further connected in series to the central control unit by a bus acknowledgment line through a bus acknowledgement input terminal for receiving bus acknowledgement signals from the central control unit, or from a preceding peripheral unit, and through a bus acknowledgment line output terminal for relaying the received signals to a subsequent peripheral unit.

The present invention provides a bus protocol interface circuit for the peripheral units that prevents a conflict in bus requests between the peripheral units and permits bipolar drivers to be used for fast operation.

The interface circuit comprises a logic means coupled to the bus acknowledgment line input terminal and the bus acknowledgment line output terminal for generating a logic output signal responsive to the signals on the bus acknowledgement line input and output terminals, and latching means coupled between the bus request line and the bus request line terminal, and further connected to the output of the logic means and the bus acknowledgment line output terminal, for latching into a state consistent with a bus request signal from any one of the peripheral units and for unlatching from the consistent state upon receipt of a bus acknowledgment signal in response to the bus request signal.

DETAILED DESCRIPTION

In the computer system described previously, with reference to FIGS. 1 and 2, signals on the various lines 11,13 switch between two logic levels, which for reference purposes will be referred to herein as logic zero and one levels or a low and high level, respectively. An output terminal may be designed to drive the connected line to either the one or zero level. Alternatively, an output terminal may be designed to drive the connected line to only one of the zero or one levels. When the output terminal is not driving the connected line to this level, other devices connected to the line determine the level on the line. In both MOS and bipolar technology, the former output terminal type is referred to as "totem-pole". In MOS technology the latter output terminal type is often implemented as an open drain, and in bipolar technology an open collector design is often used. In either case, when multiple outputs of this latter type are connected together a logical AND or OR function may be generated.

Figure 3:
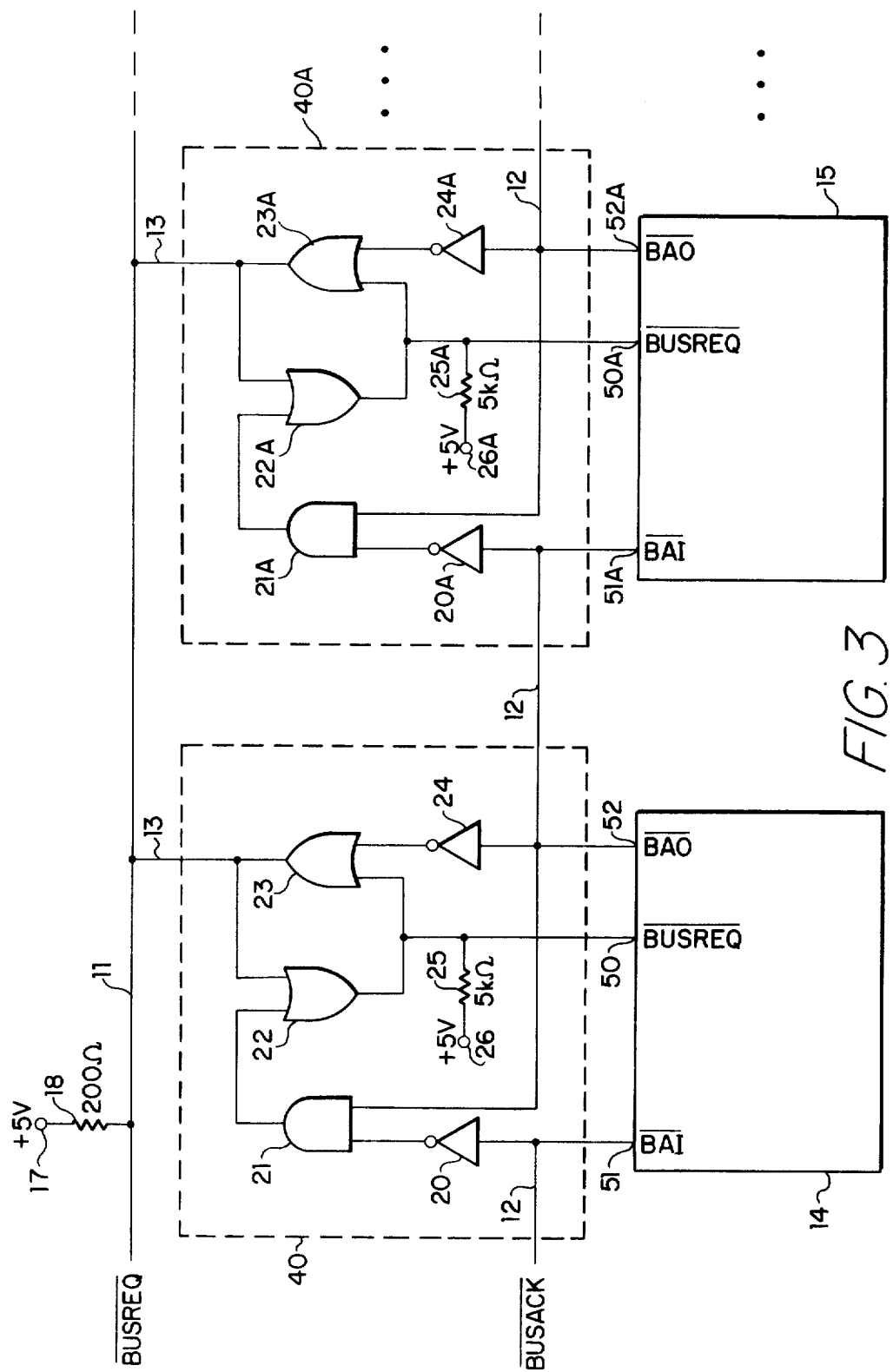

FIG. 3 shows an implementation of the invention using bipolar logic including open-collector output terminals. By connecting the bus request line 11 to a +5 volt voltage supply at a terminal 17 through a resistor 18, the bus request line is held at this voltage level unless one of the peripheral units signal a request for control of the bus by pulling the bus request line 11 to ground potential.

Preferably, the resistor 18 should have a low value of a few hundred ohms so that the RC time constant of the bus request line is low and voltage changes occur quickly. However, as noted earlier, a shortcoming in the system shown in FIG. 1 is that the circuits of the peripheral units cannot cope with large currents if the peripheral unit is implemented in MOS technology. By making resistor 18 a low value, large currents will flow when the bus request line 11,13 is at ground. On the other hand, a large value for resistor 18 (thousands of ohms) increases the RC time constant and slows the signaling response of the line 11,13.

The present invention is directed to overcome both the current problem and the problem of protocol conflict discussed earlier. The embodiment shown in FIG.

Figure 1:
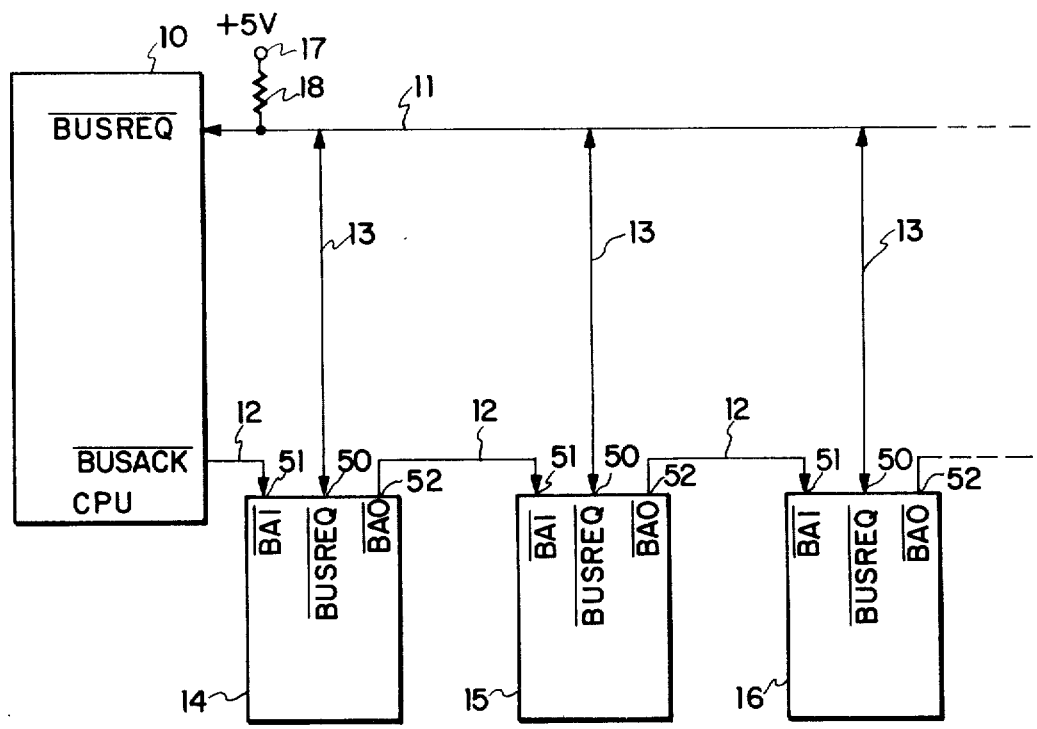
FIG. 1 shows a computer system to which the present invention is adaptable.
Figure 2:
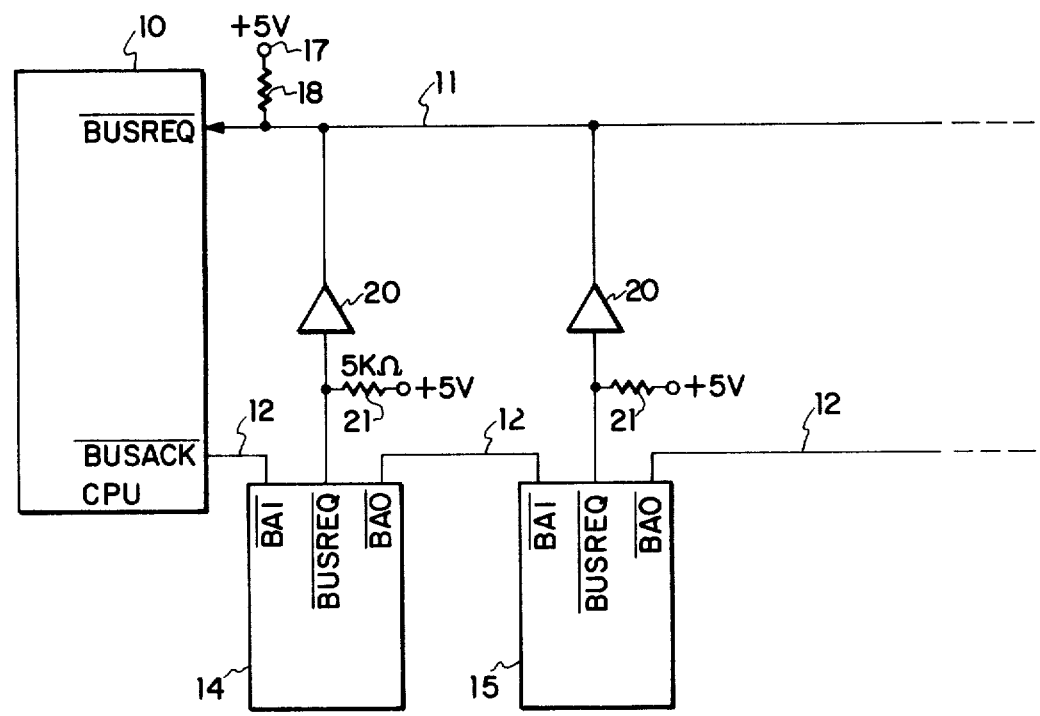
FIG. 2 illustrates a prior art solution to one of the problems existing in the system of FIG. 1; and, FIG. 3 is a logic diagram of the present invention.

3 includes a bus protocol interface circuit for each peripheral unit of the original system in FIG. 1, with only two peripheral units 14 and 15 shown for operational comparision. The bus protocol interface circuit 40A for unit 15 is identical to the circuit 40; and for purposes herein, the elements of the circuit 40A are identically numbered with the additional suffix "A".

The interface circuit 40 includes an AND gate 21 having one input terminal connected to the BAO terminal 52 of the peripheral unit 14 and another input terminal connected to the BAI terminal 51 of the peripheral unit 14 through an inverter 20. The gate 21 generates a combinatorial logic signal responsive to the signal on the BUSACK line 12 going into the BAI terminal 51 and further responsive to the signal upon the bus acknowledgment line 12 and the BAO terminal 52.

The output signal of the AND gate 21 forms one input signal to a latch formed by two cross-coupled OR logic gates 22 and 23 having open-collector outputs. The first OR gate 22 and the second OR gate 23 each have a first input terminal coupled to the output terminal of the other gate. A second input terminal of the first OR gate 22 is connected to the output terminal of the AND gate 21. A second input terminal of the second OR gate 23 is connected to the BAO terminal 52 of the peripheral unit 14 through an inverter 24. The output terminal of the first OR gate 22 is also connected to the BUSREQ terminal 50 of the peripheral unit and the output terminal of the second OR gate 23 is connected to the bus request line 11, 13.

The BUSREQ terminal 50 is also coupled to a plus 5 volt voltage supply at a terminal 26 through a resistor 25. The resistor 25 typically has a large value of 5 kilohms thereby permitting the peripheral unit 14 to be implemented in MOS technology. Since the length of the line connecting the BUSREQ terminal 50 with the cross-coupled OR gates 22,23 is short, the RC time constant associated with the terminal 50, remains small so that the response time of the terminal is fast. On the other hand, with the interface circuit 40 as a buffer in bipolar technology, the resistor 18 can be small for fast response times of the bus request line 11,13.

Initially, with no peripheral unit requesting the bus and the CPU 10 in control of the bus, the BUSREQ line 11, 13 is high. The BUSACK line 12 will also be high and the terminal 50 will be high. To request the bus, each peripheral unit is set such that it cannot make a request unless the bus request line terminal 50 and the BAI terminal 51 are both high.

Should the peripheral unit 14 make a bus request, the BUSREQ terminal 50 is set low. The OR gate 23 then has both inputs low since the bus request terminal 50 is low and the high signal on the BAO terminal 52 is inverted by the inverter 24. The output of the OR gate 23 is thereby driven low. At the same time, the output signal of the AND gate 21 is also low since it receives a low signal from the inverted high signal on the BUSACK line 12 connected to the BAI terminal 51. The low output signal from the logic gate 21 and the low output of the OR gate 23 make the output signal of the OR gate 22 low also; and, thus the latch formed by the OR gates 22 and 23 is latched in the low state.

Similarly, the latch in all the other interface circuits of the other peripheral units latch into a low state. For example, in the interface circuit 40A with the peripheral unit 15, the output signal of the AND gate 21A is low for the same reason as discussed for the AND gate 21. Since the bus request line 11, 13 is low, both input signals to the OR gate 22A are low, thereby making the output signal of the gate 22A low. The OR gate 23A then has both of its input signals low because the inverter 24A makes the high signal on the terminal 52A low; and, thus the latch formed by the cross coupled OR gates 22A and 23A are in a state consistent with a requesting level on the bus request line. All the interface circuits of the peripherial units of the system are thus in a low state indicating that one or more of the peripheral units has requested control of the bus.

After sensing that the bus request line 11 is low, the CPU 10 responds with a low-level bus acknowledgment signal on the line 12. Since the device in closest proximity to the CPU 10 is the peripheral unit 14, which is requesting bus control, the interface circuit 40 will unlatch. The BAI terminal 51 of the unit 14 goes low because the BUSACK signal goes low. The BUSREQ terminal 50 remains low because the unit 14 is driving it and the BAO terminal 52 remains high since the unit 14 is requesting control of the bus. In this state the interface circuit 40 becomes unlatched with the output signal of the AND gate 21 going high. The output signal of the OR gate 22 is no longer effective in driving the terminal 50. Furthermore, since the BAO terminal 52 is being held at a high level, both inputs to the OR gate 23 are at a low level, and hence the OR gate 23 output remains low.

After the peripheral unit 14 has completed its operation the BUSACK signal is provided on the BAO terminal 52 and the low-level BUSREQ signal on the terminal 50 is removed. The output of the AND gate 21 will go to a low level when the terminal 52 goes to a low level, which will remove the low level driving the OR gate 23 (by the output of the inverter 24 going to a high level) thereby removing the low level driving the line 13. Note, however, that the bus request line 11, 13 is still low because the interface circuits of the succeeding peripheral units are still latched at a low level. The peripheral unit 14 passes the low-level BUSACK signal to the next peripheral unit 15. The BAI terminal of the unit 15 becomes low. The peripheral unit also makes the signal on the BAO terminal 52A go low since it is not the requesting unit and merely transfers the signal from its BAI terminal 51 to the BAO terminal 52. The output signal of the AND gate 21A is therefore low. On the other hand, since the BAO terminal 52 is now low following the low-level signal on the BAI terminal 51, the OR gate 23A receives a high-level signal making its output signal cease driving a low level. The OR gate 22A has both input signals low, since the bus request line 11, 13 remains low making the output of the gate 22A low also. Since the output signal of the OR gate 23A is not driving a low-level signal, the cross-coupled OR gates 22A and 23A are unlatched.

In a similar fashion the BUSACK signal is transmitted along the line 12 unlatching the interface circuits of all the remaining peripherial units, which circuits are unlatched upon receipt of the BUSACK signal as described previously. As long as one interface circuit of one peripheral unit remains latched, the bus request line 11 remains low. When the last peripheral unit is unlatched, then the bus request line 11, 13 goes high indicating to the CPU 10 that the bus control is no longer required by a peripheral unit. In this state, however, no peripheral unit can initiate a new bus request because the BAI terminal of each unit is still low while the bus request line is high. The CPU 10 will go through its clock cycle and resume control over the bus. Then it will drive the bus acknowledgment line 12 to a high level. The system is now in its original state and ready for a new bus request.

Though the example above has the closest peripheral unit 14 requesting the bus, the interface circuits operate to allow any unit to request the bus. If a unit somewhere in the middle of a chain of units on the signal line 12 requests the bus, all peripheral units in closer proximity along the chain to the CPU 10 unlatch as described above for the interface circuit 40A until the BUSACK signal on the line 12 reaches the requesting unit. The interface circuit for the requesting bus operates in a manner similar to that described for the circuit 40 hereinabove. Then the remaining interface circuits unlatch as the BUSACK signal reaches each corresponding peripheral unit. When the last unit is unlatched, the bus request line 11, 13 returns high.

Not only does the bus protocol interface circuit avoid the conflict in bus control between a CPU and a peripheral unit as discussed previously, but also it permits signaling on the bus request line 11, 13 to be performed much faster. In FIG. 3 the interface circuit is shown separate from the peripheral unit proper. This indicates that the interface circuit can be implemented in bipolar technology, which is much faster than MOS technology and is capable of handling much larger currents. Thus, the possible large parasitic RC time constant on the bus request line does not pose a problem. Furthermore, the interface circuit can be implemented in an integrated circuit form as part of the peripheral unit itself. Such a unit would at least avoid the problem of bus control conflict discussed above. Moreover, if the parasitic capacitance of the bus request line is a problem for a specific system wherein the peripheral units are in MOS form, then the same circuit in bipolar form can be connected externally to the MOS peripheral unit having the identical interface circuit integrated within the same peripheral unit. The two interface circuits are compatible and can be "stacked", so to speak, one upon the other.

Accordingly, while the invention has been particularly shown and described with reference to the perfered embodiments, it will be understood by those skilled in the art that changes in form and details may be made therein without departing from the spirit of the invention. This is therefore intended that an exclusive right be granted to the invention as limited only by the metes and bounds of the appended claims.

What is claimed is:

1. In a computer system having a central control unit and a plurality of peripheral units all being coupled to a common bus, each of said peripheral units being further coupled in parallel to said central control unit by a bus request line through a respectively comprised bus request line terminal for requesting the central control unit for control of said bus and each of said peripheral units being further coupled in series to said central control unit by a bus acknowledgement line to said central control unit through a respectively comprised bus acknowledgement line input terminal for receiving from said central control unit a bus acknowledgement signal granting access to said bus in response to a bus request, and through a respectively comprised bus acknowledgement line output terminal for relaying said received signal to subsequent peripheral units only when it has not requested bus control or when it has initiated an outstanding bus control request and also has finished accessing the bus in response to said received signal, an interface circuit associated with each peripheral unit, respectively for preventing a bus request conflict between said peripheral units, said associated interface circuit respectively comprising:

logic means coupled to said bus acknowledgement line input terminal as a respectively associated peripheral unit and to said bus acknowledgement line output terminal of said respectively associated peripheral unit for generating a combinatorial logic output signal responsive to the signals on said bus acknowledgement line input and output terminals, and;

latching means coupled in series between said bus request line and said bus request line terminal of said respectively associated peripheral unit, and further connected to the output of said logic means and said bus acknowledgement line output terminal of said respectively associated peripheral unit, for latching itself into a first state in response to a bus request from said respectively associated peripheral unit and for unlatching itself from said first state when the associated peripheral unit has received said but acknowledgement signal if said associated peripheral unit has not initiated any outstanding bus control request, and when the associated peripheral unit has received said bus acknowledgement signal and also has finished accessing said bus in response to said received bus acknowledgement signal if said associated peripheral unit has initiated said outstanding bus control request, (1) the latching into said first state by anyone of said latching means causes all other latching means to be also latched into said first state, (2) a bus request signal is maintained over said bus request line as long as any of said latching means is latched in said first state, (3) said central control unit discontinues said acknowledgement signal over the bus acknowledgement line only when all of said latching means have been respectively unlatched, and (4) in response to said acknowledgement signal from the central control unit, all latching means latched in said first state are sequentially unlatched in corresponding order of the respective time of receipts of said acknowledgement signal by their respectively associated peripheral units.

2. The circuit as in claim 1 further characterized by said bus request line being coupled to a voltage supply through a first resistor means and said bus request line terminal being coupled to said voltage supply through a second resistor means, said first resistor means having a substantially lower value in comparison to said second resistor means, whereby the RC time constant for signals from said bus request line terminal is substantially smaller than the RC time constant for signals on said bus request line.

3. The circuit as in claim 1 further characterized by said bus request signals and bus acknowledgement signals operate in active low logic, said logic means further including an AND logic gate and said latching means including cross-coupled OR logic gate circuitry.

4. The circuit as in claim 3 further characterized by a first input terminal of said AND logic gate being connected to said bus acknowledgement line input terminal through a first inverter means, and a second input terminal of said logic gate being connected to said bus acknowledgement line output terminal.

5. The circuit as in Claim 3 further characterized by said cross-coupled OR logic gate circuitry further including first and second OR logic gates each having an output terminal respectively connected to a first input terminal of the other OR logic gate, a second input terminal of said first OR logic gate being coupled to the output terminal of said AND logic gate, said output terminal of said first OR logic gate also being coupled to said bus request line terminal, said output terminal of said second OR logic gate also being coupled to said bus request line, and a second input terminal of said second OR logic gate being coupled to said bus acknowledgement line.

* * * * *